United States Patent
Barangan et al.

(10) Patent No.: US 7,099,856 B2
(45) Date of Patent: Aug. 29, 2006

(54) METHODS AND APPARATUSES FOR SELLING, DISTRIBUTING AND DISPENSING FABRIC CARE PRODUCTS

(75) Inventors: Anastacia Rosario Aricayos Barangan, Cainta Rizal (PH); John Gregory Schroeder, Mason, OH (US); Emanuel Pantelis Fakoukakis, Kobe (JP); Steven Robert Chuey, Kobe (JP)

(73) Assignee: The Procter & Gamble Company, Cincinnati, OH (US)

( * ) Notice: Subject to any disclaimer, the term of this patent is extended or adjusted under 35 U.S.C. 154(b) by 304 days.

(21) Appl. No.: 09/903,266

(22) Filed: Jul. 11, 2001

(65) Prior Publication Data

US 2002/0091657 A1    Jul. 11, 2002

Related U.S. Application Data

(63) Continuation-in-part of application No. 09/862,742, filed on May 22, 2001, now abandoned.

(60) Provisional application No. 60/206,077, filed on May 22, 2000.

(51) Int. Cl.
*G06F 17/00* (2006.01)
*G06N 5/02* (2006.01)

(52) U.S. Cl. .............. 706/50; 706/14; 706/12
(58) Field of Classification Search ........... 706/50, 706/14, 12; 705/10; 707/2
See application file for complete search history.

(56) References Cited

U.S. PATENT DOCUMENTS

| | | | |
|---|---|---|---|
| 6,484,158 B1 * | 11/2002 | Johnson et al. | 705/36 R |
| 6,550,672 B1 * | 4/2003 | Tracy et al. | 235/383 |
| 6,640,249 B1 * | 10/2003 | Bowman-Amuah | 709/228 |
| 6,658,568 B1 * | 12/2003 | Ginter et al. | 713/193 |
| 2001/0014888 A1 | 8/2001 | Herz et al. | |
| 2001/0042002 A1 * | 11/2001 | Koopersmith | 705/10 |
| 2003/0054965 A1 | 3/2003 | Barangan et al. | |
| 2003/0058277 A1 * | 3/2003 | Bowman-Amuah | 345/765 |

OTHER PUBLICATIONS

Prosecution From Case AA-473, U.S. Appl. No. 09/862,742, filed May 22, 2001.

* cited by examiner

*Primary Examiner*—Joseph P. Hirl
(74) *Attorney, Agent, or Firm*—Jason I. Camp; David V. Upite

(57) ABSTRACT

A method for recommending fabric care products, by the steps of: under control of a first client system; collecting personalized data pertaining to a consumer's fabric care needs and habits and pertaining to non-fabric care related information; and sending the data to a server system. Then, under control of the server system: receiving the data from the first client system, and based on the consumer's personalized data determining a recommendation for one or more fabric care products. The recommendation is then sent to the first client system, a second client system or both. The recommendation can assist the consumer in their fabric care usage and purchase decisions, and automated purchasing can also be accomplished. Apparatuses for carrying out these methods are also disclosed.

10 Claims, 3 Drawing Sheets

METHODS AND APPARATUSES FOR SELLING, DISTRIBUTING AND DISPENSING FABRIC CARE PRODUCTS

CROSS REFERENCE TO RELATED APPLICATION

This patent application is a continuation-in-part of U.S. application Ser. No. 09/862,742 filed May 22, 2001 now abandoned by A. R. A. Barangan et al., which claims the benefit of U.S. Provisional Application Ser. No. 60/206,077 filed May 22, 2000 by A. R. A. Barangan, et al.

TECHNICAL FIELD

The present invention relates to computer methods and apparatuses for facilitating the selling, distributing and dispensing of fabric care products. The methods can be conducted over the Internet, or other consumer interactive interfaces, such as a home computer or kiosk. The fabric care products are generally in liquid, granular, paste, or tablet form. Additionally, the fabric care products can be provided in other forms, such as absorbed on an inert substrate, such as a sheet product.

BACKGROUND OF THE INVENTION

The selection and purchase of fabric care products is a process that is highly dependent on the particular needs and habits of each consumer. For example, the ages, number and gender of the people in the household has a tremendous effect on the type and amount of fabric care products that are used by the household members. The type of clothing worn also effects the selection of fabric care products. A wardrobe rich in cotton and silk fabrics requires different care than a predominantly polyester wardrobe. And consumers differ in the frequency with which they care for their fabric articles.

Most fabric care products give consumers clear instructions on how to use that particular product. And some laundry detergent compositions might come with a suggestion to use a particular fabric softener composition. But beyond these limited instructions and suggestions, consumers are left to their own best judgment regarding which fabric care products to purchase and what quantity to purchase. Further complicating the purchase and use decisions faced by many consumers is the rapid increase in the number and type of fabric care products. In addition to common detergents and fabric conditioners (which come in an ever increasing selection), there are a variety of new compositions for fabric spot treatment, pretreating, wrinkle reduction and removal, bleaching, color protection, static control and others. The number of combinations of different products that can be purchased and used by consumers is astronomical indeed. It is difficult for consumers to evaluate and use these various products in an optimal manner.

Moreover, fabric care products, such as laundry detergents, fabric softeners, spot removal compositions and the like, have traditionally been sold to consumers at stores where other household products are sold. Grocery stores, drug stores, hardware stores and the like are the most common places to purchase fabric care products. But it is often inconvenient to travel to the store whenever one does not have enough of one or more particular fabric care products. And it is quite common for consumers to deplete the supply of one product before the companion products are depleted. This results in many trips to the store to purchase individual products. Obviously, consumers can stockpile or purchase products in large quantities to minimize the number of trips to the store, but this presents storage problems and might result in the degradation of the product being stockpiled.

All of the problems discussed above can be addressed by giving consumers the ability to customize the purchase of their fabric care products. And by providing customized usage instructions or dosages for the numerous and varied fabric care products available based on a consumers specific needs. Thus, there exists a need for methods and apparatuses for assisting consumers in the purchase and use of various fabric care products. These methods should be easily accessible to the consumer, whether they are at home, shopping or driving in their car.

SUMMARY OF THE INVENTION

In one embodiment, the present invention is directed to a method for recommending fabric care products. The method comprises the steps of: under control of a first client system; collecting personalized data pertaining to a consumer's fabric care needs and habits and sending the data to a server system. Under control of a server system the data is received from the first client system and based on the consumer's personalized data determining a recommendation for one or more fabric care products. Finally, the recommendation is sent to the first client system, a second client system or both. Preferably, the recommendation for the one or more fabric care products is received by the first client system and optionally displayed.

In another aspect of the present invention, the personalized data pertaining to a consumer's fabric care needs and habits is collected by interaction with the consumer. Specifically, under control of the first client system one or more queries are displayed. In response to one or more actions by the consumer, answers to the one or more queries are sent to a server system. Preferably, the personalized data will include fabric care needs and habits of a consumer. Especially preferred is personalized data pertaining to a consumer's fabric care needs and habits is selected from the group consisting of: the number, ages and gender of the people in the consumer's household; the frequency with which fabric care processes are conducted by the consumer or by members of the consumer's household; the type and color of fabrics that are cared for; and mixtures thereof.

In yet another aspect of the present invention there is provided a method for recommending fabric care products for purchase or use. The method comprises the steps of: under control of an interactive user interface, collecting personalized data pertaining to a consumer's fabric care needs and habits. The personalized data is compared to a data repository, wherein the data repository comprises fabric care data selected from the group consisting of fabric care products, dosage recommendations, usage instructions, and mixtures thereof. Based on this comparison, a fabric care recommendation is prepared. Preferably, the interactive user interface comprises a computer assembly connected to the data repository, a display device and an input device. And even more preferably the fabric care recommendation is displayed on the display device.

The present invention is also directed to apparatuses for providing a fabric care recommendation. The apparatus preferably comprises a data repository comprising fabric care data selected from the group consisting of fabric care products, dosage recommendations, usage instructions, and mixtures thereof. More preferably, the apparatus further comprises: an input device for receiving user input from a consumer; and a computer assembly connected to the data repository. Wherein the computer assembly comprises a CPU, and a display for displaying the fabric care recommendation.

The methods and apparatuses of the present invention provide many advantages to the consumers of fabric care products. For example, the methods can be conducted in variety of convenient locations with the assistance of a computer or the Internet. Many computers and devices for accessing the Internet can be used to carry out the present methods. With the increasing portability of computing and data transfer devices, the present methods can be conducted almost anywhere, for example, in a home, in a car, or in a shopping area. These methods can provide consumers with personalized fabric care recommendations, usage instructions, and dosage suggestions. Moreover, the present methods can facilitate the purchase of fabric care products, regardless if the actual purchase is based on the recommendation provided or if the consumer makes their own selection.

The apparatuses of the present invention provide additional convenience to consumers by providing the necessary tools to recommend optimal fabric care products based on the individual needs of the consumer. And these apparatuses can preferably be used to dispense products to the consumer or to one or more fabric treatment machines.

Due to the myriad of new fabric care products continually being introduced and the regular modifications of existing products, the present invention provides a substantial benefit to consumers. Specifically, the present methods and apparatuses can help consumers optimize their selection and use of fabric care products without the need for time consuming and expensive experimentation.

BRIEF DESCRIPTION OF THE DRAWINGS

While the specification concludes with claims particularly pointing out and distinctly claiming the invention, it is believed that the invention will be better understood from the following description of preferred embodiments which is taken in conjunction with the accompanying drawings in which:

DETAILED DESCRIPTION OF THE INVENTION

The present invention provides interactive methods for making a customized recommendation of one or more fabric care products to a consumer, and apparatuses for performing the methods. A "consumer" can be any person, business, institution or the like that uses fabric care products. Moreover, the "consumer" can be any person who uses or participates in the purchasing decision of fabric care products.

Figure 1:
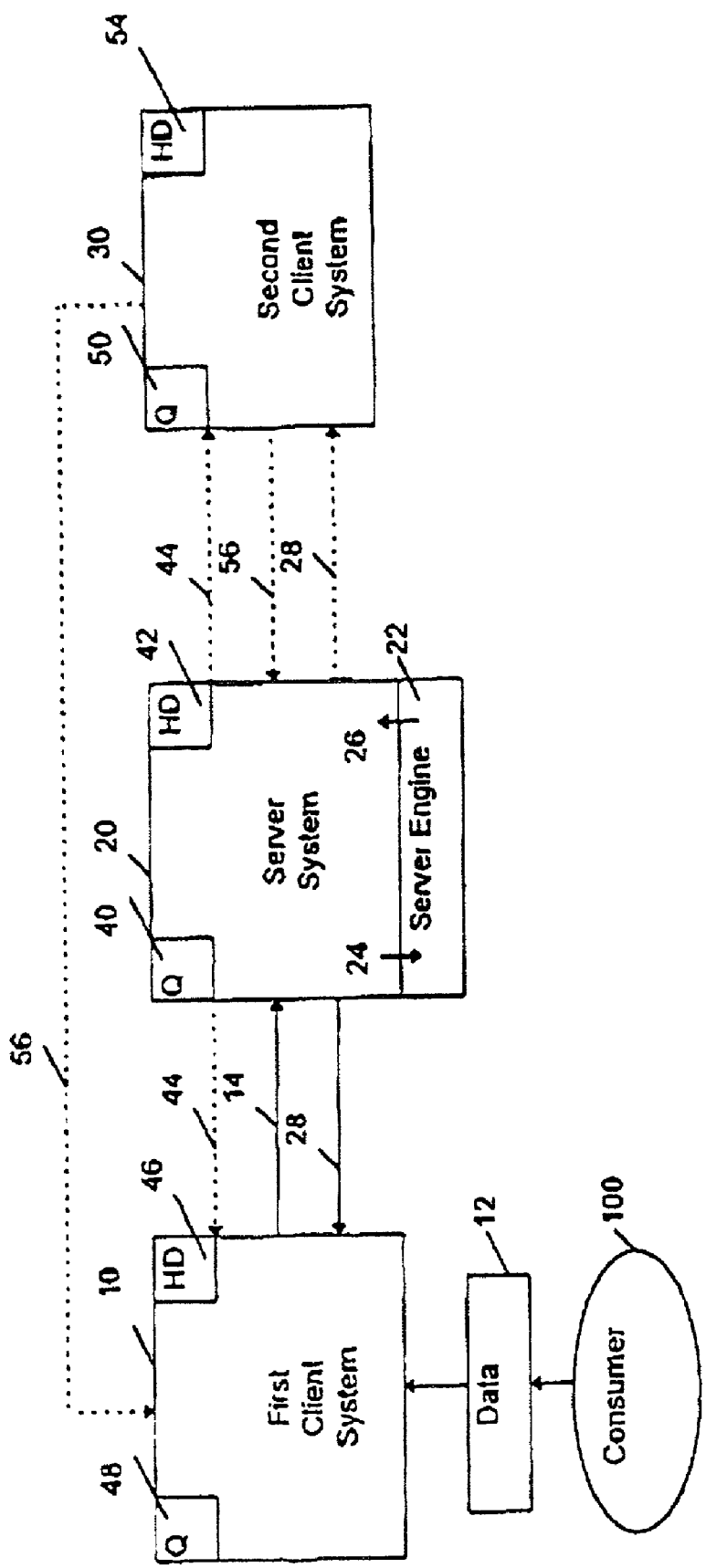
FIG. 1 is a schematic representation of one method according to the present invention.

Turning now to the drawings where FIG. 1 is a schematic representation of one method according to the present invention showing a first client system 10 in communication with a server system 20, and optionally a second client system 30. More specifically, under control of first client system 10 personalized data 12 pertaining to a consumer's fabric care needs and habits is collected and sent to server system 20 via transmission 14. Under control of server system 20 data 14 is received from first client system 10 and processed, for example, in a server engine 22. A fabric care recommendation 26 is prepared under control of server system 20. Fabric care recommendation 26 is then send to first client system 10, a second client system 30, or both via fabric care recommendation transmission 28.

Input personalized data 12 can be entered into client system 10 by consumer 100. In addition to, or in place of input personalized data 12 entered by consumer 100, client historical data 46, server historical data 42, or external historical data 54 can be used as the personalized data 24. Client historical data 46 is associated with first client system 10, for example, it can be stored in the memory of a computer assembly under control of first client system 10. Likewise, server historical data 42 is associated with sever system 20, for example it can be stored in the memory of a computer assembly under control of server system 20. And external historical data 54 is associated with any external system, for example second client system 30. Input data 12, client historical data 46, server historical data 42 and external historical data 54 can be generated in response to queries 40, 48 and 50. First client queries 48 are generated by first client system 10, server queries 40 are generated by server system 20, and external queries 50 are generated by an external source, for example, second client system 30. External queries 50 and external historical data 54 can be transmitted to either of server system 20 or first client system 10 via transmission 56. Likewise, server queries 40 and server historical data 42 can be transmitted to either of second client system 30 or first client system 10 via transmission 44.

Preferably, personalized data 24 will be an accumulation of input data 12 and historical data (for example, 42, 46 and 54) regarding the fabric care needs and habits of consumer 100. It is understood that a consumer can be responsible for fabric care of many people, for example, the members of the consumer's household, or the patrons of the consumer's business. The term "household" as used herein is intended to encompass members of a family, people sharing a living space, patrons of a business or institution (for example hotels, hospitals, restaurants, schools, etc.), and the like. Thus, a household can be any collection of people who have fabric articles that are generally cared for together with the fabric articles of the other members of the same household.

The consumer's personalized data 24 preferably takes into account information about all of the fabric articles that a given consumer cares for. Especially preferred personalized data is selected from the group consisting of: the number, ages and gender of the people in the consumer's household; the frequency with which fabric care processes are conducted by the consumer or by members of the consumer's household; the type and color of fabrics that are cared for; fabric care preferences, e.g. perfumes, degree of softness etc.; features of fabric care that are liked and disliked by the consumer; typical outcome of laundering and fabric care that need improvement; type(s) of equipment used by the consumer to launder their fabrics e.g. automated or non-automated washing machines, types of automated dispensers in washer, dryers etc.; location of equipment used by the consumer to launder their fabrics e.g. in-home or commercial laundry; and mixtures thereof. Any other data that is useful for selecting and recommending fabric care products is intended to be included under the definition of personalized consumer data.

In addition, it is preferred that the personalized consumer data contain at least some information that is not directly related to the functional care of fabrics in the consumer's household, referred to herein as non-fabric care related information. More specifically, it is preferred that at least a portion of the personalized consumer data include information concerning the consumer's lifestyle and life's preferences, e.g. non-fabric care related preferences but that will provide insight into the consumer's fabric care needs and preferences. Personalized consumer data that is non-fabric care related or which is not directly related to improving the outcome of fabric cleaning processes include but are not limited to the consumer's budget considerations such as household income; space considerations within the household; non-fabric care products and/or applicances in the consumer's household; existence and identity of any allergies of household members; the relative priority of fabric care operations to other household and family demands on the consumer's time; the consumer's habits, hobbies and personal interests; the consumer's ambitions and life goals; the consumer's stage in life, e.g. young adult, newly-wed, new parent, parent with grown children living outside the household etc.; preferred media, e.g. radio, television, internet, and/or print as well as specific sources within a given media; and mixtures thereof.

A non-limiting example of non-fabric care related information that may provide insight into a consumer's fabric care needs and preferences is the specific newspaper that the consumer typically reads. A group of consumers that read a given newspaper will share one or more common characteristics such as higher income, common stage in life, and/or a common interest such as a desire to maintain a well kept image or appearance. By obtaining from the consumer personalized non-fabric care related information, information concerning the consumer's fabric care preferences is obtained without directly asking the consumer for personalized consumer data pertaining to the consumer's fabric care needs, habits or preferences.

As discussed above, this personalized data can be input by the consumer or it can come from one or more databases of information about a particular consumer, consumers having similar households as a particular consumer, or general consumer data. The data that is input by a particular consumer can be saved as historical data (in any of the systems discussed above) to be recalled each time that same consumer requests a new recommendation. It is understood that each time a particular consumer requests a new fabric care recommendation, that consumer should be given the opportunity to update and correct their historical data.

The methods of the present invention include the preparation and transmission of a recommendation for one or more fabric care products. The recommendation can be for use, purchase, or just for the general education of the consumer. That is, the recommendation places no obligation on the consumer to buy or use the recommended fabric care products. The recommendation can be prepared, for example, in a server engine 22 of server system 20, based upon personalized data 24. Recommendation 26 is transmitted within server system 20 before being transmitted to first client system 10, second client system 30 or both. In one preferred aspect of this invention the recommended fabric care products have at least one common characteristic, wherein the common characteristic is selected from the group consisting of perfume, product color, package color, and mixtures thereof. Examples of such fabric care products can be found in co-pending applications entitled A METHOD FOR CARING FOR A FABRIC ARTICLE AND FOR PROVIDING A SYSTEM THEREFOR, filed in the name of Nobuhiko Honma et al., and A KIT FOR CARING FOR A FABRIC ARTICLE, filed in the name of John Gregory Schroeder, et al. both applications filed on May 19, 2000. The entire disclosure of both the Honma et al. and Schroeder, et al. applications are incorporated herein by reference.

As shown in FIG. 1, the recommendation is sent to the first client system via recommendation transmission 28. In another aspect of this invention, the recommendation is sent to second client system 30 in addition to, or instead of first client system 10. Preferably, fabric care recommendation 26 for the one or more fabric care products is received by first client system 10 and optionally displayed. The first client system will generally be a system under control of the consumer, while the server system may be, for example an Internet Web page, and the second client system can be, for example, a system under control of a retailer, wholesaler, distributor, or manufacturer of fabric care products. The benefit of sending the recommendation to a second server system is to facilitate the purchase of the fabric care products, and to generate and maintain historical databases that will assist in future recommendations and sales of fabric care products. The interaction with a second client system will be discussed in greater detail below in conjunction with the discussion of FIG. 2. It is preferred recommendation transmission 28 is received and displayed by first client system 10.

First client system 10, second client system 30, and server system 20 are preferably individual computer assemblies linked via the Internet, modems, direct transmission lines or any other method of electronic communication. Client systems and server systems are well known in the art, see for example U.S. Pat. No. 5,960,441, which issued to Hartman et al., on Sep. 28, 1999. The entire disclosure of this Hartman et al. patent is incorporated herein by reference. Even more preferably, the server system comprises a customized web site having a user interface, wherein the user interface includes consumer identification data unique to each consumer who accesses the web site, and wherein the consumer identification data is stored in a data repository and is used to create a unique consumer profile corresponding to the consumer identification data for each consumer. It is the consumer identification data that can be used to associate a given consumer with that consumers historical data (for example, 42, 46 and 54). As is well know to those in the art of electronic communication and commerce, the Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other web pages available on that server computer system or other server computer systems.

Figure 2:
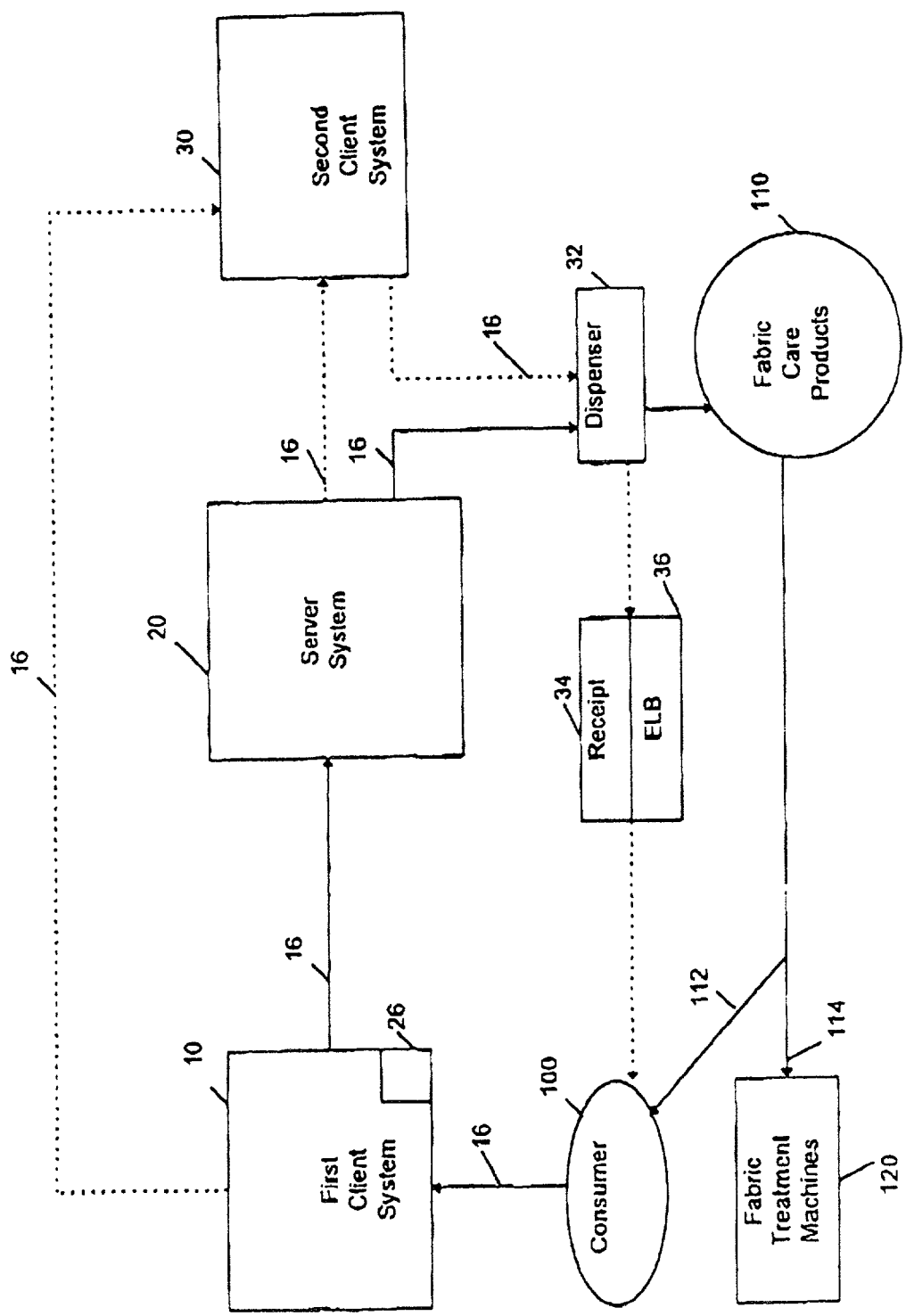
FIG. 2 is a schematic representation of another method according to the present invention.

Turning now to FIG. 2, which is a schematic representation of another method according to the present invention, wherein consumer 100 uses first client system 10 to send a purchase request 16 for one or more fabric care products. Purchase request 16 is preferably based on a recommendation, for example 26, but it may be a purchase request based solely on the consumer's individual desires. Regardless, purchase request 16 is transmitted to server system 20, second client system 30 or both. Purchase request 16 preferably includes both the types of fabric care products desired and the quantities of each product desired for purchase. In an especially preferred method of the present invention, server system 20 calculates a recommended quantity for each of the one or more fabric care products recommended for purchase and sends that recommendation to first client system 10. The recommended quantity for each of the one or more fabric care products can be selected from the group consisting of an individual dose, a predetermined multiple of individual doses, consumer selected multiples of individual doses and mixtures thereof. It is understood that purchase request 16 from consumer 100 can be for different fabric care products and for different quantities than those recommended by server system 20.

When first client system 10, is communicating with server system 20 via the Internet, consumer 100 can be presented with an order Web page that prompts consumer 100 for the consumer-specific order information to complete the order. That Web page may be pre-filled with information that was provided by consumer 100 when placing a previous purchase request. The information is then validated by server system 20 and the order is completed.

After fabric care products purchase request 16 is sent to server system 20, second client system 30 or both, and the consumer specific information is validated as discussed above, the fabric care products selected for purchase are identified, packaged and delivered to the consumer. Specifically, the fabric care products can be those readily available to all consumers, or they an be individually prepared and packaged for consumer 100. The fabric care products can be dispensed directly 112 to consumer 100 or they can be automatically dispensed 114 to fabric treatment machines 120, which can be, for example, a fabric laundering machine, a fabric drying apparatus, a fabric pretreater, a fabric iron, an ironing board, and the like. It is understood that dispenser 32 can be under the control of server system 20, second client system 30, or, as is discussed below in conjunction with FIG. 3, computer assembly 202 of apparatus 200. Automated dispensing devices for fabric treatment machines are known to the art, but they generally require the consumer to select the fabric care products and the dosages. The methods of the present invention can provide the actual doses of the individual fabric care products. Fabric treatment machines 120 will generally be under control of consumer 100, but this need not be the case.

Fabric care products 110 selected for purchase can be delivered to the consumer at any convenient location, for example at the consumer's home or place of business. Alternatively, consumer 100 can take delivery of fabric care products 110 at a store or other distribution center. The recommendation and purchase information can be generated remotely with respect to the store or distribution center, or the purchase and recommendation information can be generated within the store or distribution center. It is envisioned that the methods of the present invention can be conducted entirely within a store that sells or distributes fabric care products. That is, computer terminals can be provided within the store or distribution center (such apparatuses are discussed below) for the consumer to receive the recommendation for fabric care products as discussed herein. The consumer can use this recommendation to assist them in shopping for fabric care products, or optionally, the recommendation can be the basis for selecting one or more fabric care products for purchase. After selecting the one or more fabric care products for purchase consumer 100 can receive fabric care products 110 directly from a dispensing machine 32, or fabric care products 110 can be delivered to consumer 100 later in time. If consumer 100 needs to wait for fabric care products 110 while, for example, they are prepared and packaged for the consumer, consumer 100 is preferably issued a receipt 34 to identify the products and quantities purchased. In an especially preferred embodiment of the present invention, these in-store transactions are facilitated by including with, or as part of receipt 34 an electronic transmitter beacon 36. Thus, the location of consumer 100 can be determined electronically with the assistance of electronic transmitter beacon 36, allowing consumer 100 to continue shopping, wait in their car, or go to a nearby coffee shop. Once consumer 100 is located with the assistance of electronic transmitter beacon 36, fabric care products 110 can be delivered directly to the consumer. Such electronic transmission devices are known to the art, see for example U.S. Pat. No. 5,844,405, entitled METHOD AND APPARATUS FOR LOCATING UTILITY CONVEYANCES IN AN ENCLOSED AREA, which issued on Dec. 1, 1998, to Eslambolchi et al. The entire disclosure of the Eslambolchi et al. patent is incorporated herein by reference.

Figure 3:
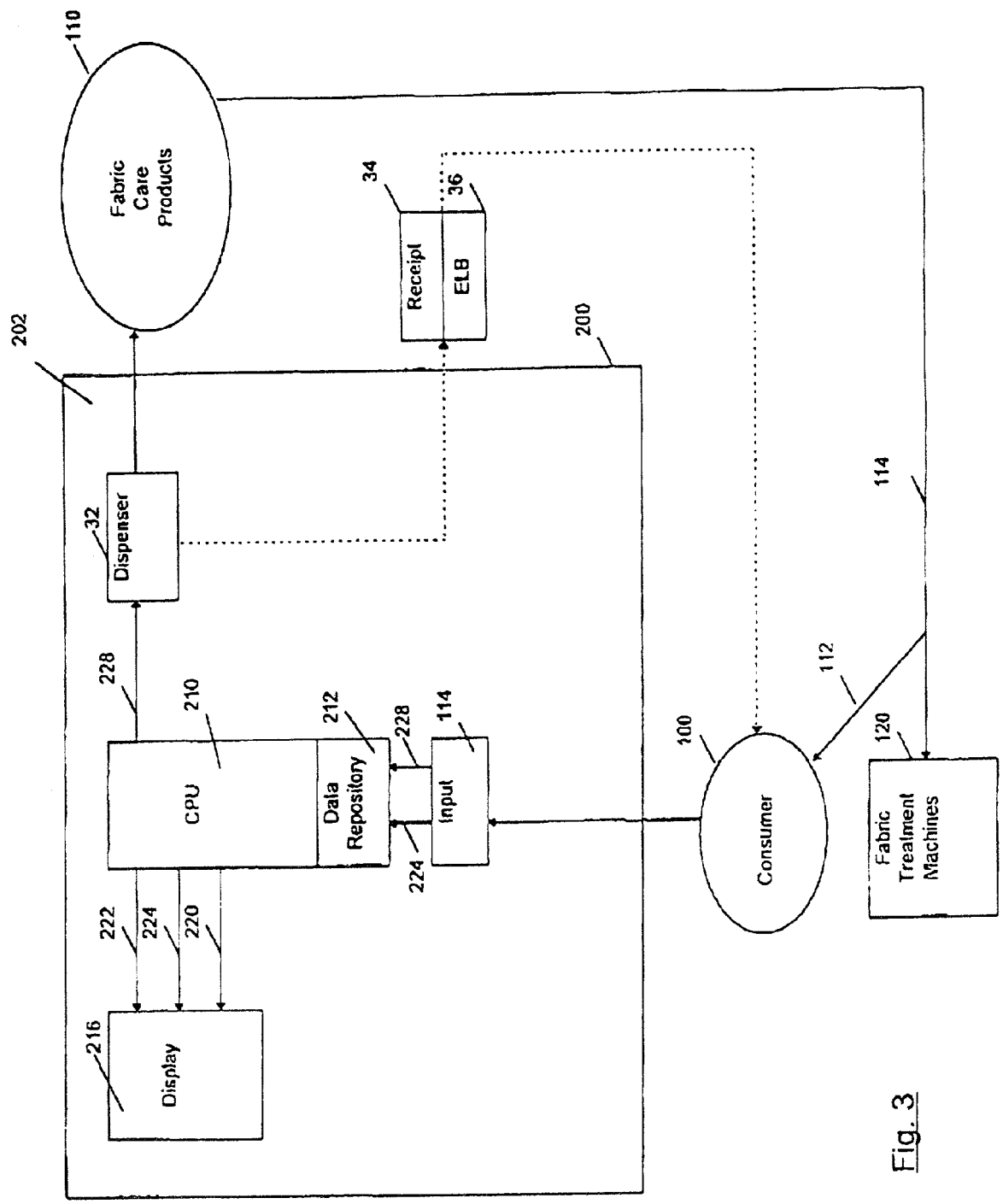
FIG. 3 is a schematic representation of one apparatus according to the present invention.

Turning now to FIG. 3, which is a schematic representation of an apparatus 200 according to the present invention. Specifically, apparatuses 200 for providing fabric care recommendations according to this invention comprises a data repository 212, which comprises fabric care data selected from the group consisting of fabric care products, dosage recommendations, usage instructions, and mixtures thereof. Preferably, the fabric care products in the data repository are selected from the group consisting of laundry detergents, fabric conditioning compositions, wrinkle removal compositions, bleaches, bleach activators, dye fixatives, stain removers, anti-static compositions, dryer added sheet products and mixtures thereof.

More preferably, the apparatus further comprises: an input device 214 for receiving user input from consumer 100; and a computer assembly 202 connected to data repository 212. Computer assembly 202 comprises a CPU 210, and a display 216. Display 216 can be, for example a monitor, a printer, or the like. Even more preferably, apparatus 200 further comprises a computer readable storage medium containing computer executable instructions for computer assembly 202. Input device 214 can comprise a keypad, a hand operated pointing device, a keyboard, or the like. And preferably, apparatus 200 is a user kiosk and input device 214 is associated with the kiosk.

Preferably, computer assembly 202 of apparatus 200 is connected to a dispensing device 32 for dispensing fabric care products 110 to consumer 100 or to fabric treatment machines 120. Computer assembly 202 communicates with dispenser 32 via dispensing request 228, which is fulfilled and fabric cares products 110 are dispensed to consumer 100 via direct dispensing 112, or to fabric treatment machines 120 via automated dispensing 114. Moreover, as discussed above, a receipt 34, which can optionally comprise an electronic locator beacon 36, can be issued to consumer 100 before or along with fabric care products 110. Apparatus 200 can provide consumer 100 with fabric care product recommendation 220 based on the personalized data 224 of consumer 100, wherein fabric care product recommendation 220 comprises a list of fabric care products, dosages, usage instructions, and the like. This recommendation can be based on the consumer's historical data 226, which can be stored in data repository 212, and consumer 100 can supplement and modify historical data 226 by responding to queries 222. Using input device 214, answers to queries 222 and other personalized data 224 is collectively input by consumer 100, and optionally displayed so that consumer 100 can verify the entries. As discussed above, personalized data 224 and historical data 226 are preferably a collection of data pertaining to the consumer's fabric care needs and habits, more particularly, the data is selected from the group consisting of: the number, ages and gender of the people in the consumer's household; the frequency with which fabric care processes are conducted by the consumer or by members of the consumer's household; the type and color of fabrics that are cared for; and mixtures thereof. "Household" is defined above.

Fabric care products recommendation 220 is then sent to display 216 to be reviewed by consumer 100. Using input device 214, consumer 100 can select for purchase or use certain fabric care products 110. Fabric care products 110 are then dispensed to consumer 100 or to fabric treatment machines 120. Preferably, before fabric care products 110 are dispensed, or at the same time they are dispensed, a receipt 34 to identify the products and quantities purchased is issued to consumer 100. In an especially preferred embodiment of the present invention, an electronic transmitter beacon 36 is included with, or as part of receipt 34. Thus, the location of the consumer can be determined electronically with the assistance of electronic transmitter beacon 36, allowing the consumer to leave the proximity of apparatus 200 and located at a later time for taking delivery of fabric care products 110. Once the consumer is located with the assistance of electronic transmitter beacon 36, the fabric care products can be delivered directly to the consumer. Such electronic transmission devices are known to the art.

The methods for making recommendations to a consumer relating to one or more fabric care products have heretofore been described in terms of various computer-assisted methods. However, it expected that person to person interaction and human input may be involved in carrying out one or more of the steps of collecting personalized consumer data, determining a recommendation based on the personalized consumer data and explaining/providing the recommendation to the consumer.

More specifically, it is envisioned that the personalized consumer data may be collected through personal interaction with the consumer. This personal interaction may occur during a telephone interview or a face to face interview such as may occur at special events and events targeted to certain consumers such as seminars, conventions and workshops.

Where the server system described above is to be used in determining a recommendation, the consumer's personalized data is input into the first client system by or on behalf of the consumer. The transmission of the data from the first client system to the server system may be continuous or via a periodic data dump. Preferably, such transmission is continuous to minimize the period of time required to determine a fabric care recommendation and to deliver/display that recommendation to the consumer.

In addition to the preparation or determination of a recommendation as it is described above, it is envisioned that an expert in the field of fabric care may personally review the collected personalized consumer data and make a contribution towards determining specific recommendations for the consumer. As noted, such recommendations will be specific to address the personalized consumer data provided by the consumer and will include not only a recommendation with respect to one or more fabric care products for use by the consumer, but may also include suggestions relating to the purchase, storage and/or use of those products so as to aid the consumer in achieving an improved fabric care outcome.

The delivery and/or display of the fabric care recommendation to the consumer may be as described above, or more simply in the form of printed text and/or graphical instructions that are provided to the consumer. Further, it is envisioned that the consumer will have the opportunity to discuss the recommendations with an expert in the field of fabric care via telephone, face to face etc., to insure that the consumer has an adequate understanding of the recommendation(s).

Furthermore, it is also anticipated that samples of one or more fabric care products may accompany or be provided to the consumer in association with the fabric care recommendations to enable the consumer to act on the recommendations and experience first hand an improved fabric care outcome. In that many recommendations will be displayed electronically for the consumer contemporaneously with the submission with personalized consumer data from a remote location, the provision of product samples to the consumer may not occur until subsequent to the display of the recommendations. Alternatively or in addition, the provision of product may occur via coupon, discount program, or a sale of the product with a promise of reimbursement if not fully satisfied with the fabric care recommendations provided.

Fabric Care Products

A "fabric care product" can be any composition used to treat a fabric, or fabric article. Fabric care products can be liquid, granular, tablets, or the like, and these products can be provided in dissolvable pouches, absorbed onto inert sheet or other inert substrates. Fabric care products are intended to encompass: pretreating compositions; compositions for use in the fabric washing process such as detergents, bleaches, softeners, conditioners, odor removers, antibacterial agents and the like; additives for use in the fabric drying process, such as softeners, anti-static compositions, wrinkle preventives, and the like; and post treatment compositions, such as wrinkle removers, starches, ironing aids, and the like. One group of fabric care products can be selected from the group consisting of laundry detergents, fabric conditioning compositions, wrinkle removal compositions, bleaches, bleach activators, dye fixatives, stain removers, anti-static compositions, dryer added sheet products and mixtures thereof. Non-limiting examples of fabric care products can be found in co-pending applications entitled A METHOD FOR CARING FOR A FABRIC ARTICLE AND FOR PROVIDING A SYSTEM THEREFOR, filed in the name of Nobuhiko Honma et al., and A KIT FOR CARING FOR A FABRIC ARTICLE, filed in the name of John Gregory Schroeder, et al. both applications filed on May 19, 2000. The entire disclosure of both the Honma et al. and Schroeder, et al. applications are incorporated herein by reference.

More specific information on fabric care products and ingredients for use therein are discussed below. For example, fabric care products can comprise: a detersive enzyme, preferably along with an enzyme stabilization system; an inorganic peroxygen bleaching compound, which is preferably selected from the group consisting of alkali metal salts of perborate, percarbonate and mixtures thereof; a bleach activator, which is preferably nonanoyloxybenzene sulfonate. Common ingredients in fabric care products include, but certainly are not limited to, detersive surfactants, detergent builders, and other detergent ingredients. These ingredients are discussed below, and additional information on these, and other ingredients for use in fabric care products can be found in U.S. Pat. No. 5,466,802, issued Nov. 14, 1995 to Panandiker et al.; U.S. Pat. No. 4,548,744 to Connor, issued Oct. 22, 1985; U.S. Pat. No. 4,597,898 to Vander Meer, issued Jul. 1, 1986; and U.S. Pat. No. 5,565,145 to Watson, et al., issued Oct. 15, 1996, all of these patents are hereby incorporated by reference.

Detersive Surfactant

The fabric care products discussed herein may contain a detersive surfactant. Detersive surfactants utilized can be of the anionic, nonionic, zwitterionic, ampholytic or cationic type or can comprise compatible mixtures of these types. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. All of these patents are incorporated herein by reference. Of all the surfactants, anionics and nonionics are preferred.

Additional suitable surfactants, including polyhydroxy fatty acid amides and amine based surfactants, are disclosed in co-pending PCT Application WO98/14300, Published Mar. 25, 1999, entitled *Laundry Detergent Compositions with Cyclic Amine Based Polymers to Provide Appearance and Integrity Benefits to Fabrics Laundered Therewith*, which was filed on Sep. 15, 1997, in the name of Panandiker et al. The entire disclosure of the Panandiker et al. reference is incorporated herein by reference.

Detergent Builder

The fabric care products discussed herein may contain a detergent builder. Detergent builders are well known in the art and can comprise, for example, phosphate salts as well as various organic and inorganic nonphosphorus builders.

Water-soluble, nonphosphorus organic builders useful herein include the various alkali metal, ammonium and substituted ammonium polyacetates, carboxylates, polycarboxylates and polyhydroxy sulfonates. Suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. Particularly preferred polycarboxylate builders are the oxydisuccinates and the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Examples of suitable nonphosphorus, inorganic builders include the silicates, aluminosilicates, borates and carbonates. Particularly preferred are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Also preferred are aluminosilicates including zeolites. Such materials and their use as detergent builders are more fully discussed in Corkill et al., U.S. Pat. No. 4,605,509, the disclosure of which is incorporated herein by reference. Also discussed in U.S. Pat. No. 4,605,509 are crystalline layered silicates which are suitable for use in the detergent compositions of this invention.

Optional Detergent Ingredients

In addition to, or in place of surfactants and builders, the fabric care products discussed herein can include any number of additional optional ingredients. These include conventional detergent composition components such as enzymes and enzyme stabilizing agents, suds boosters or suds suppressers, anti-tarnish and anticorrosion agents, bleaching agents, soil suspending agents, soil release agents, germicides, pH adjusting agents, non-builder alkalinity sources, chelating agents, organic and inorganic fillers, solvents, hydrotropes, optical brighteners, dyes and perfumes.

Preferred optional ingredients for incorporation into the detergent compositions herein comprises a bleaching agent, e.g., a peroxygen bleach. Such peroxygen bleaching agents may be organic or inorganic in nature. Inorganic peroxygen bleaching agents are frequently utilized in combination with a bleach activator.

Useful organic peroxygen bleaching agents include percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, Hartman, Issued Nov. 20, 1984; European Pat. Application EP-A-133,354, Banks et al., Published Feb. 20, 1985; and U.S. Pat. No. 4,412,934, Chung et al., Issued Nov. 1, 1983. Highly preferred bleaching agents also include 6-nonylamino-6-oxoperoxycaproic acid (NAPAA) as described in U.S. Pat. No. 4,634,551, Issued Jan. 6, 1987 to Burns et al.

Inorganic peroxygen bleaching agents, e.g., the perborates, the percarbonates, etc., are preferably combined with bleach activators, which lead to the in situ production in aqueous solution (i.e., during use of the compositions herein for fabric laundering/bleaching) of the peroxy acid corresponding to the bleach activator. Various non-limiting examples of activators are disclosed in U.S. Pat. No. 4,915,854, Issued Apr. 10, 1990 to Mao et al.; and U.S. Pat. No. 4,412,934 Issued Nov. 1, 1983 to Chung et al. The nonanoyloxybenzene sulfonate (NOBS) and tetraacetyl ethylene diamine (TAED) activators are typical and preferred. Mixtures thereof can also be used. See also the hereinbefore referenced U.S. Pat. No. 4,634,551 for other typical bleaches and activators useful herein.

Another highly preferred optional ingredient in the detergent compositions herein is a detersive enzyme component. Enzymes can be included in the present detergent compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability, optimal thermostability, and stability to active detergents, builders and the like. In this respect bacterial or fungal enzymes are preferred, such as bacterial amylases and proteases, and fungal cellulases.

"Detersive enzyme", as used herein, means any enzyme having a cleaning, stain removing or otherwise beneficial effect in a laundry detergent composition. Preferred enzymes for laundry purposes include, but are not limited to, proteases, cellulases, lipases, amylases and peroxidases.

Detergent Composition Preparation

The detergent compositions according to the present invention can be in liquid, paste, tablet or granular form. Such compositions can be prepared by combining the essential and optional components in the requisite concentrations in any suitable order and by any conventional means.

Granular compositions, for example, are generally made by combining base granule ingredients, e.g., surfactants, builders, water, etc., as a slurry, and spray drying the resulting slurry to a low level of residual moisture (5–12%). A description of such agglomeration processes can be found in U.S. Pat. Nos. 5,691,297 and 5,489,392, both of which were filed in the name of Nassano et al., and are assigned to the Procter & Gamble Co. The entire disclosure of U.S. Pat. Nos. 5,691,297 and 5,489,392 are incorporated herein by reference. Dry ingredients can be admixed in granular powder form with the spray dried granules or agglomerates in a rotary mixing drum. The liquid ingredients, e.g., solutions of enzymes, binders and perfumes, can be sprayed onto the resulting granules to form the finished detergent composition. Granular compositions according to the present invention can also be in "compact form", i.e. they may have a relatively higher density than conventional granular detergents, i.e. from 550 to 950 g/l. In such case, the granular detergent compositions according to the present invention will contain a lower amount of "inorganic filler salt", compared to conventional granular detergents; typical filler salts are alkaline earth metal salts of sulphates and chlorides, typically sodium sulphate; "compact" detergents typically comprise not more than 10% filler salt.

Liquid detergent compositions can be prepared by admixing the essential and optional ingredients thereof in any desired order to provide compositions containing components in the requisite concentrations. Liquid compositions according to the present invention can also be in "compact form", in such case, the liquid detergent compositions according to the present invention will contain a lower amount of water, compared to conventional liquid detergents.

The methods and compositions heretofore disclosed may also be applied towards the production of particles that may be used as one of the component detergent granules in a granular detergent composition.

Fabric Treatment Methods

The fabric care products, and more specifically, detergent compositions, are intended to be used to treat fabric articles. Such a fabric treatment method employs contacting the fabrics with an aqueous washing solution formed from an effective amount of the detergent compositions hereinbefore described or formed from the individual components of such compositions. Contacting of fabrics with washing solution will generally occur under conditions of agitation although the compositions of the present invention may also be used to form aqueous unagitated soaking solutions for fabric cleaning and treatment.

Agitation is preferably provided in a washing machine for good cleaning. An effective amount of a high density liquid or granular detergent composition in the aqueous wash solution in the washing machine is preferably from about 500 to about 7000 ppm, more preferably from about 1000 to about 3000 ppm.

Fabric Conditioning and Softening

As described above, fabric care products include fabric conditioners and softeners. These products are used in conjunction with, or instead of the detergent compositions herein, and are used to treat and condition fabrics and textiles in the absence of the surfactant and builder components of the detergent composition embodiments of this invention. Thus, for example, a fabric conditioning composition may be added during the rinse cycle of a conventional home laundering operation in order to impart the desired conditioning an softening benefits hereinbefore described.

Suitable fabric softening agents are disclosed in co-pending PCT Application WO98/14300, Published Mar. 25, 1999, entitled *Laundry Detergent Compositions with Cyclic Amine Based Polymers to Provide Appearance and Integrity Benefits to Fabrics Laundered Therewith*, which was filed on Sep. 15, 1997, in the name of Panandiker et al. The entire disclosure of the Panandiker et al. reference was incorporated by reference above.

What is claimed is:

1. A method for recommending a fabric care product to a consumer, the method comprising the steps of:
    (a) collecting, on an Internet Web site, personalized consumer data comprising the consumer's preference to a perfume;
    (b) based on the personalized consumer data, recommending a fabric care product to the consumer.

2. The method of claim 1, wherein the fabric care product is chosen from a laundry detergent, fabric softening composition, wrinkle removal composition, bleach, bleach activator, dye fixative, stain remover, anti-static composition, dryer added sheet product, or combination thereof.

3. The method of claim 1, wherein the step of recommending a fabric care product to the consumer further comprises recommending the fabric care product on the Internet Web site.

4. The method of claim 1, wherein the personalized consumer data further comprises the consumer's hobbies personal interests, or combinations thereof.

5. The method of claim 1, wherein the step of recommending a fabric care product to the consumer further comprises recommending the fabric care product on the Internet Web site; and wherein the fabric care product is a fabric softening composition.

6. The method of claim 1, wherein the step of recommending a fabric care product to the consumer further comprises recommending the fabric care product on the Internet Web site; and wherein the fabric care product is a dryer-added sheet product.

7. The method of claim 5, wherein the personalized consumer data further comprises the consumer's hobbies, personal interests, or combinations thereof.

8. The method of claim 5, wherein the personalized consumer data further comprises the consumer's personal interests.

9. The method of claim 1 wherein, the fabric care preference is chosen from a perfume or a degree of softness.

10. The method of claim 1, wherein the step of recommending a fabric care product to the consumer further comprises recommending the fabric care product on the Internet Web site; and wherein the fabric care product is a laundry detergent.

* * * * *